Jan. 17, 1950
A. HUYTON
2,494,659
PIPE JOINT
Filed Feb. 6, 1946
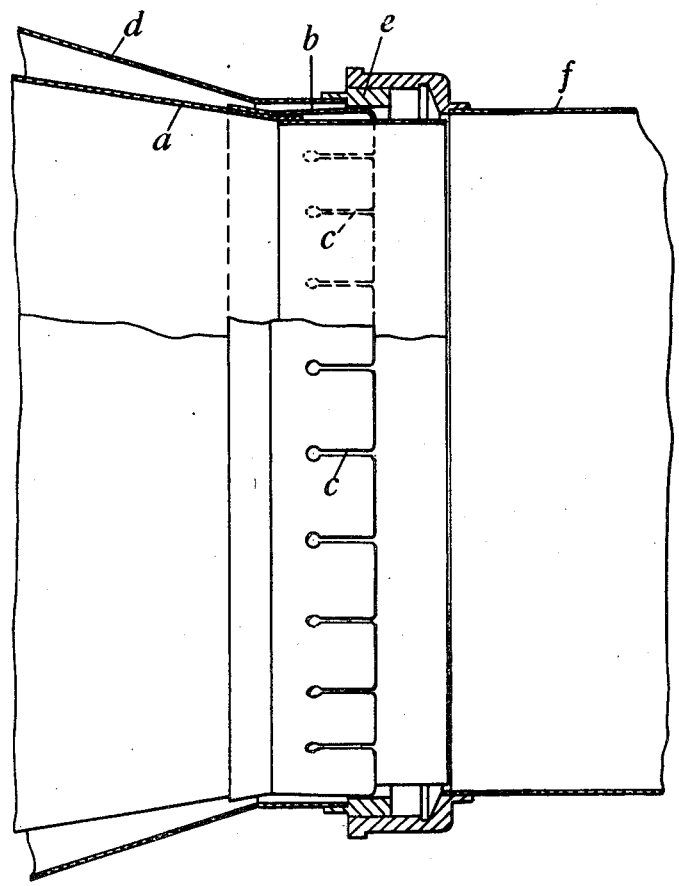
Inventor
A. Huyton
By Glascock Downing Seeble
Attys.

Patented Jan. 17, 1950

2,494,659

UNITED STATES PATENT OFFICE 2,494,659

PIPE JOINT

Alfred Huyton, Birmingham, England, assignor to Joseph Lucas Limited, Birmingham, England Application February 6, 1946, Serial No. 645,889
In Great Britain December 22, 1944

Section 1, Public Law 690, August 8, 1946
Patent expires December 22, 1964

3 Claims. (Cl. 285—22)

This invention relates to internal combustion prime movers of the kind in which liquid fuel is burnt in a combustion chamber, and after admixture of diluent air with the products of combustion, the energy of the resulting hot gases is utilised in a turbine, propulsion jet, or the like. Combustion occurs in one end of a chamber which is open at the other end, and at the latter end of this chamber is arranged an extension which forms a mixing chamber, the two parts being surrounded by an air jacket, or alternatively a relatively long combustion chamber is used, secondary or other additional air inlets being provided at positions ahead of the primary combustion zone, the chamber being surrounded by an air jacket.

Usually the structure is made from sheet metal, and to obviate excessive thermal stresses the discharge end of the mixing chamber is supported by an expansion joint, the joint being formed by slidably supporting the discharge end of the said chamber in the adjacent part of the air jacket. The device is, however, not entirely satisfactory as it does not accommodate radial stresses set up in the end by the action of heat, and the object of the present invention is to provide an improved construction which can accommodate both longitudinal and radial expansions.

The invention comprises a structure in which the expansion joint is not only adapted to accommodate relative longitudinal movements but is also radially resilient.

One form of structure to which the invention is applicable comprises a cylindrical sheet metal combustion chamber having a domed or conical end at which liquid fuel and a restricted amount of air can be admitted. The discharge end of this chamber opens into a gradually tapering mixing chamber which forms an extension of the combustion chamber, and to which diluent air can be admitted from a surrounding air jacket, this jacket being fed from the same source as the combustion chamber. The portion of the structure beyond the discharge end of the mixing chamber consists of a duct whereby the hot gases are conveyed to a turbine or elsewhere.

Referring to the accompanying drawing which illustrates in section one embodiment of the invention, I secure around the annular discharge end $a$ of the mixing chamber, a sheet metal ring $b$, and in this ring I form a number of longitudinal slots $c$ adapted to impart radial resilience to the said ring, each slot preferably terminating at its closed end in a circular hole of sufficiently large diameter to allow a stream of cooling air to flow therethrough from the jacket $d$ to the interior of the joint and effect a useful amount of cooling at that part. In the adjacent portion of the air jacket $d$ a gland ring or other annular support $e$ is secured to support the end $a$ of the mixing chamber through the medium of the ring $b$ and permit the said end to move longitudinally due to thermal expansion and contraction. The joint between the jacket and mixing chamber end therefore not only permits longitudinal relative movements to occur, but also prevents binding between the parts due to radial expansion, or a tendency to radial expansion, of the inner part under the action of heat. The part $f$ in the drawings is a portion of the duct whereby the hot gases are conveyed to the turbine or the discharge outlet.

Alternatively, instead of securing a ring $b$ to the end of the mixing chamber, the said end may itself be formed with slots as $c$ and directly supported in the gland ring $e$.

The application of the invention to a structure in which an elongated combustion chamber is used with provision for admission of additional air for completion of the combustion initiated in the primary combustion region, and in which diluent air is admitted from the jacket at the discharge end of this combustion chamber, is essentially similar to that above described, with the difference that the region around the expansion joint is adapted to allow air to flow from the jacket to a duct leading to the turbine or elsewhere.

Further, instead of imparting radial resiliency to the inner member of the joint, that is to say the discharge end of the mixing chamber or combustion chamber, I secure the resilient ring $b$ in the adjacent part of the jacket, in which case the end of the part $a$ supported by the ring is not slotted, and radial expansion or contraction of this part is accommodated by the resiliency of the ring $b$.

The invention is not, however, restricted to the examples described, and subordinate constructional details may be modified to meet different requirements.

Having thus described my invention what I claim as new and desire to secure by Letters Patent is:

1. An air-jacketed sheet metal combustion chamber for a prime mover of the kind specified, having between adjacent ends of inner and outer parts a sheet metal expansion joint which is radially resilient to accommodate expansion of the inner part under the action of heat, and which is separate from one of the said parts to accommodate relative longitudinal movements thereof.

2. An air-jacketed sheet metal combustion chamber as claimed in claim 1, in which the expansion joint consists of a sheet metal ring provided with longitudinal slots to render it radially resilient.

3. An air-jacketed sheet metal combustion chamber as claimed in claim 2, in which the outer of the two parts between which the resilient ring is arranged has secured to it a gland ring, the resilient ring being secured to the inner of the said parts, and being slidable in the gland ring.

ALFRED HUYTON.

REFERENCES CITED

The following references are of record in the file of this patent:

UNITED STATES PATENTS

| Number | Name | Date |
|---|---|---|
| 264,760 | Kling | Dec. 2, 1941 |
| 2,274,688 | Griepenstrob | Nov. 3, 1942 |

FOREIGN PATENTS

| Number | Country | Date |
|---|---|---|
| 116,140 | France | Dec. 22, 1876 |